US012754813B2

(12) United States Patent
Bert

(10) Patent No.: US 12,754,813 B2
(45) Date of Patent: Oct. 6, 2026

(54) MEMORY SUB-SYSTEM TESTING AND VALIDATION

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 13 days.

(21) Appl. No.: 19/072,820

(22) Filed: Mar. 6, 2025

(65) Prior Publication Data

US 2025/0284605 A1 Sep. 11, 2025

Related U.S. Application Data

(60) Provisional application No. 63/563,011, filed on Mar. 8, 2024.

(51) Int. Cl.

*G06F 11/26* (2006.01)
*G06F 11/22* (2006.01)
*G06F 11/263* (2006.01)

(52) U.S. Cl.

CPC ........ *G06F 11/263* (2013.01); *G06F 11/2221* (2013.01); *G06F 11/2247* (2013.01)

(58) Field of Classification Search

CPC ....... G06F 11/3037; G06F 2009/45583; G06F 2009/45587; G06B 2219/14085
USPC ............................................... 714/33, 42, 53
See application file for complete search history.

(56) References Cited

U.S. PATENT DOCUMENTS

2015/0379167 A1* 12/2015 Griffith ............... G06F 9/45533 703/22
2020/0334022 A1* 10/2020 Bhatnagar ................. G06F 8/60
2021/0191832 A1* 6/2021 Hamor ................... G11C 29/50
2023/0060943 A1* 3/2023 Xu ......................... G06F 3/0619
2024/0175916 A1* 5/2024 Malisic ................. G06F 3/0607

FOREIGN PATENT DOCUMENTS

CN 119806735 A * 4/2025

* cited by examiner

*Primary Examiner* — Chae M Ko
(74) *Attorney, Agent, or Firm* — Schwegman Lundberg & Woessner, P.A.

(57) ABSTRACT

The disclosure configures a memory sub-system controller to test and validate a memory sub-system. The controller configures a plurality of namespaces associated with a set of memory components based on configuration information received from a virtual machine comprising an operating system. The controller performs a first set of memory operations using a first namespace based on a first set of instructions received from a first application instance and performs a second set of memory operations using a second namespace based on a second set of instructions received from a second application instance. The controller causes the operating system of the virtual machine to generate one or more metrics associated with the memory sub-system based on performance of the first and second sets of memory operations.

20 Claims, 6 Drawing Sheets

MEMORY SUB-SYSTEM TESTING AND VALIDATION

PRIORITY APPLICATION

This application claims the benefit of priority to U.S. Provisional Application Ser. No. 63/563,011, filed Mar. 8, 2024, which is incorporated herein by reference in its entirety.

TECHNICAL FIELD

Examples of the disclosure relate generally to memory sub-systems and, more specifically, to testing and validating operations of the memory sub-systems.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
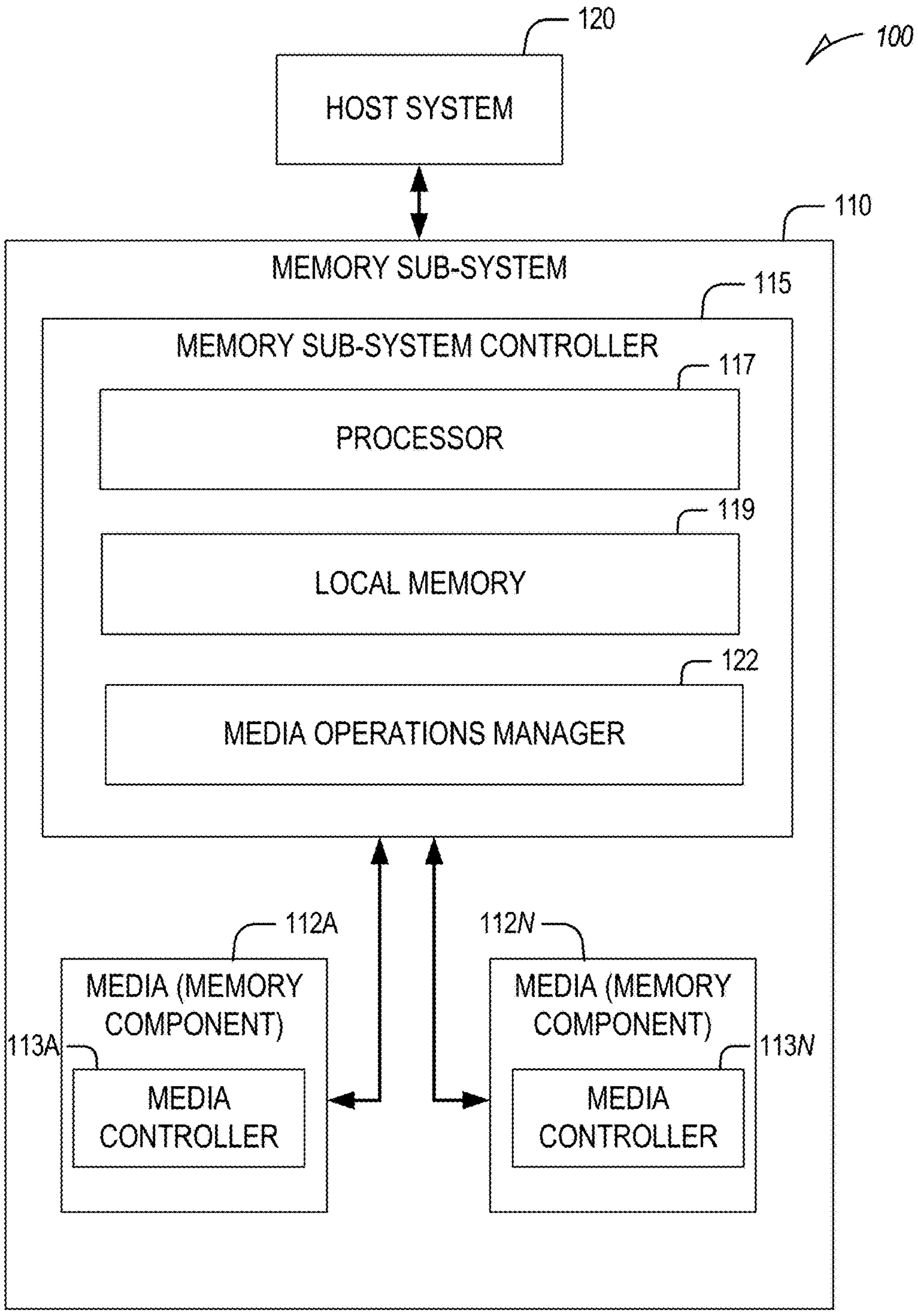
FIG. 1 is a block diagram illustrating an example computing environment including a memory sub-system, in accordance with some examples.

Examples of the present disclosure configure a system component, such as a memory sub-system controller (and/or host), to enable an operating system of a host device to test and verify operations of a memory sub-system (e.g., an SSD) in a scalable and efficient manner. Specifically, the disclosed techniques receive, by a memory sub-system controller, instructions from an operating system of a single virtual machine to configure multiple namespaces or virtual functions. The controller can then receive, via the operating system of the single virtual machine, instructions from various application instances. Each application instance can perform operations using a respective one of the namespaces. In some cases, the application instances represent input/output (IO) operations of corresponding operations without implementing the applications themselves.

The operating system can monitor traffic between the various application instances and the respective virtual functions or namespaces and between the application instances themselves. Based on that information, the operating system can test and verify operations of the memory sub-system quickly and efficiently. Namely, because a single virtual machine simulates behavior of multiple applications using its respective operating system, the operations of the memory sub-system can be tested and verified with greater efficiency.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations (also referred to as backend operations), such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., negative-and (NAND) devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Virtualized environments are becoming increasingly popular and are placing new requirements on devices, including SSDs and other memory sub-systems. In order to ensure that the virtual environment operates properly when accessing the memory sub-systems, testing and validation of SSD performance, features, and adherence to specifications is needed. There are several ways to test the virtualized environments and their interactions with the memory sub-systems. In some cases, a hypervisor (or single manager device) communicates with each virtual machine (VM), such as via a network (e.g., ethernet). The hypervisor receives the data from the respective virtual machines and generates read/write requests for the memory sub-system to perform. The hypervisor manages which namespace on the memory sub-system to use for each particular virtual machine. By having specific control over the data received from each virtual machine and the operations performed by the virtual machines with respect to their corresponding namespace, the hypervisor can generate test and validation data for the memory sub-system. Each virtual machine can operate as if it has a dedicated memory sub-system associated with the virtual machine because each virtual machine communicates the read/write requests to the hypervisor which performs any necessary translation.

The hypervisor acts as an operating system, using Virtual Machines (VM) as if they were applications. From a storage perspective, the hypervisor implements the storage stack that claims SSD Namespaces (NS) so every single IO to SSD will be processed by hypervisor that will take care of merging all VM requests. Hence, SSD will always receive commands from and send completions to a single entity named as the hypervisor. In the same way, the hypervisor will provide a virtual disk image to each VM so that the VM will think it is a dedicated physical SSD while in reality it is just a chunk of storage, often of a file system, provided by hypervisor. While this approach generally works well to test and validate operations of the memory sub-systems, the approach does not scale very well. This is because as the number of VMs grow, the complexity and processing needs imposed on the hypervisor grow. Also, the need for the hypervisor to communicate with the VMs over a network reduces the speed at which operations can be performed and reduces the overall efficiencies of the system.

Another way in which interactions between multiple VMs and the memory sub-system can be tested involves a direct assignment (SrIOV) system. In such systems, the memory sub-systems are modified to become multi-function devices and expose several virtual functions (VF) that are associated with a given namespace on the memory sub-system. The VF is exposed directly to the assigned VM and a direct attachment is created. Namely, the VM can directly see and communicate with the respective namespace on the memory sub-system through the assigned VF. This reduces the burden imposed on the hypervisor to route communications from the VMs to the corresponding namespaces, which reduces the overall complexity. The hypervisor may still be used for configuration and management but is removed from the active data path. While such systems increase the scalability of executing multiple VMs on the same memory sub-system efficiently and with minimal overhead, there is a lack of manageability. Specifically, there is no entity to monitor traffic patterns to generate test and validation data.

Examples of the present disclosure provide a memory sub-system controller for testing the above types of interactions between VMs and the memory sub-system. Specifically, the present disclosure provides a memory sub-system controller that enables an operating system of a host device to test and verify operations of a memory sub-system (e.g., an SSD) in a scalable and efficient manner. Specifically, the disclosed memory sub-system controller receives instructions (configuration data) from an operating system of a single virtual machine to configure multiple namespaces or VFs. The memory sub-system controller can then receive, via the operating system of the single virtual machine, instructions from various application instances to perform IO (e.g., read/write) operations. Each application instance can perform the IO operations using a respective one of the namespaces. Because the IO operations are routed to the memory sub-system controller via the operating system, the operating system can monitor traffic between the various application instances and the respective virtual functions or namespaces and between the application instances themselves. Based on that information, the operating system can test and verify operations of the memory sub-system quickly and efficiently. By using a single virtual machine to simulate behavior of multiple applications (e.g., based on IO profiles of each application rather than executing the full applications themselves) using its respective operating system, the operations of the memory sub-system can be tested and verified with greater efficiency and scalability. Also, because the multiple application instances are implemented on the same virtual machine and managed by the same operating system, there is no need for a hypervisor to communicate over a network with the various applications to monitor traffic patterns. This increases the scalability of testing and validating operations of a memory sub-system coupled to multiple applications.

In some examples, the memory controller configures a plurality of namespaces associated with the set of memory components based on configuration information received from a virtual machine including an operating system, the virtual machine implementing a plurality of application instances. The memory controller performs a first set of memory operations using a first namespace of the plurality of namespaces based on a first set of instructions received from a first application instance of the plurality of application instances. The memory controller performs a second set of memory operations using a second namespace of the plurality of namespaces based on a second set of instructions received from a second application instance of the plurality of application instances. The memory controller causes (or enables) the operating system of the virtual machine to generate one or more metrics associated with the memory sub-system based on performance of the first and second sets of memory operations.

The first namespace of the plurality of namespaces can be associated with a first portion of a logical address space corresponding to the set of memory components. The second namespace of the plurality of namespaces can be associated with a second portion of the logical address space corresponding to the set of memory components. In some cases, each of the plurality of namespaces is associated with a respective a VF of the memory sub-system.

The operating system of the host device or system can access a first application. The operating system determines a first IO profile associated with the first application and generates the first application instance using a script that represents the first IO profile associated with the first application. In some cases, the operating system accesses a second application and determines a second IO profile associated with the second application. The operating system generates the second application instance using another script that represents the second IO profile associated with the second application.

In some examples, the operating system generates testing and validation data based on the one or more metrics. In some cases, the operating system monitors traffic patterns associated with the first and second application instances and generates the one or more metrics based on the traffic patterns. The traffic patterns can include IO operations associated with the memory sub-system.

The memory controller associates the first application instance with the first namespace and associates the second application instance with the second namespace. The operating system generates test patterns and instructs the first and second application instances to execute the test patterns. The first application instance represents behavior of a first database system and the second application instance represents behavior of a second database system.

In some examples, the memory controller enables the first application instance to access the first namespace via a first virtual function of the memory sub-system. The memory controller enables the second application instance to access the second namespace via a second virtual function of the memory sub-system. The first set of memory operations can be received via the first virtual function and the second set of memory operations can be received via the second virtual function. The memory sub-system can include a SSD.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed. In some cases, the first memory component 112A can be implemented by a first SSD (or a first independently operable memory sub-system) and the second memory component 112N can be implemented by a second SSD (or a second independently operable memory sub-system).

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N (which are used to implement the storage capabilities of the memory sub-system 110) can include any combination of the different types of non-volatile memory components and/or volatile memory components and/or storage devices. An example of non-volatile memory components includes a NAND-type flash memory. Each of the memory components 112A to 112N can include one or more arrays of memory cells such as single-level cells (SLCs) or multi-level cells (MLCs) (e.g., tri-level cells (TLCs) or quad-level cells (QLCs)). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations (also referred to as back-end operations), such as different scan rates, different scan frequencies, different wear leveling, different read disturb management, garbage collection operations, different near miss ECC operations, and/or different dynamic data refresh.

The memory sub-system controller 115 can include hardware, such as one or more integrated circuits and/or discrete components, a buffer memory, or a combination thereof. The memory sub-system controller 115 can be a microcontroller, special-purpose logic circuitry (e.g., a field programmable gate array (FPGA), an application-specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include ROM for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the lifetime (maximum) program-erase count (PEC) values and/or reliability grades associated with different groups of the memory components 112N to 112N and/or different blocks within each of the memory components 112N to 112N of each memory component used to implement the memory sub-system. For example, the memory sub-system may be made up of three memory components (e.g., three SSDs).

In some cases, the configuration data can specify namespace configuration data. For example, the host system 120 can instruct the memory sub-system controller 115 to generate a certain quantity of namespaces (associated with respective VFs). In such cases, the configuration data can specify the logical block address (LBA) size of each namespace which can be the same or different from each other. The memory sub-system controller 115 can then generate a first namespace with a first set of LBAs (e.g., 0-100) and a second namespace with a second set of LBAs (e.g., 0-1000 or 100-1400). Each namespace can be assigned a unique identifier and that unique identifier corresponds to each VM implemented by the host system 120. The memory sub-system controller 115 receives a read/write request from the host system 120 including the unique identifier and a particular set of LBAs. The memory sub-system controller 115 identifies the corresponding namespace associated with the unique identifier and accesses an LBA map of the identified namespace to perform the memory operations being requested. This allows each VM to operate as if it has its own memory sub-system 110 without being aware of other VMs that are using the very same memory sub-system 110.

The memory sub-system controller 115 can be responsible for other memory management operations, such as wear leveling operations, garbage collection operations, error detection and ECC operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein.

Figure 2:
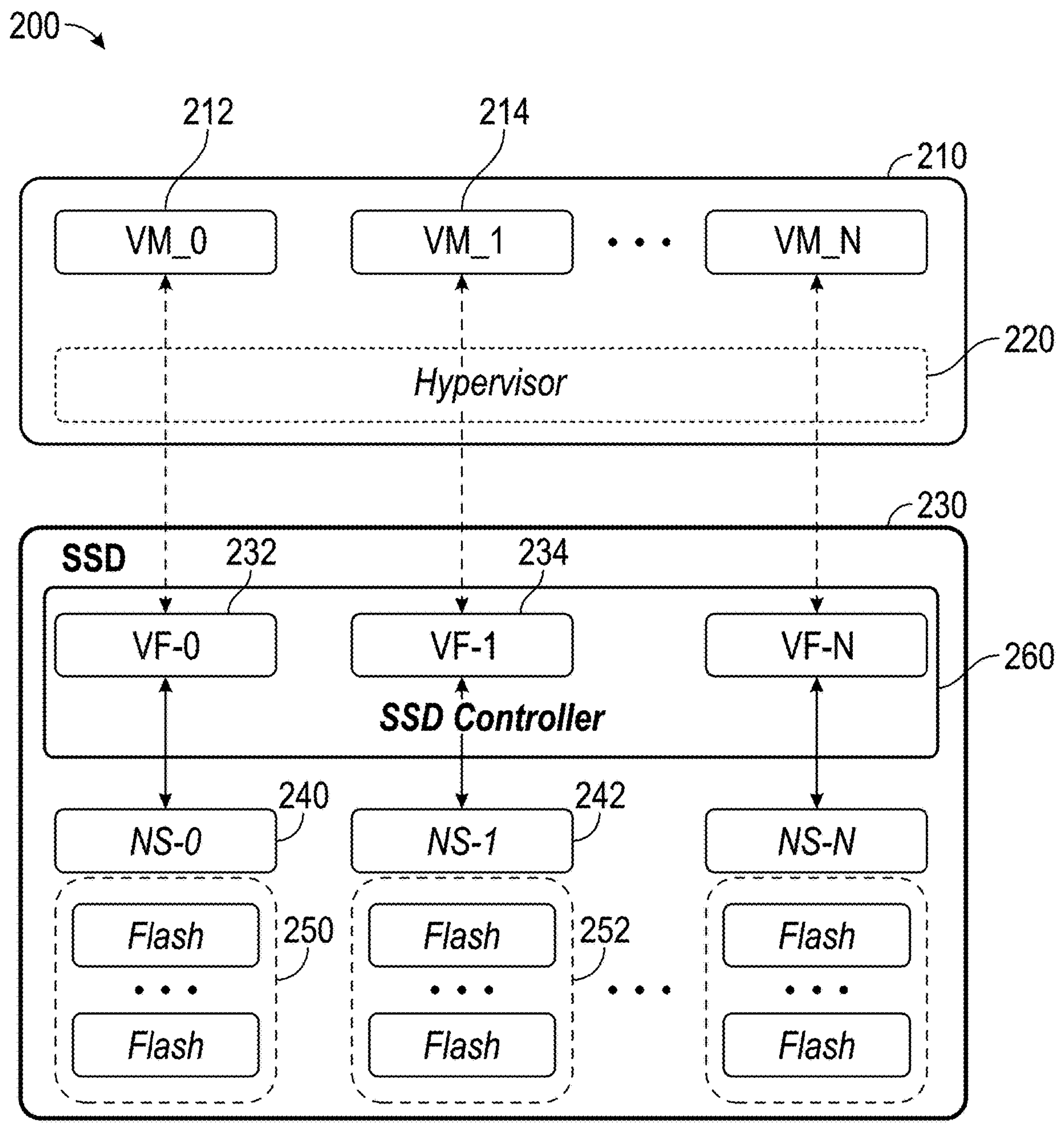
FIG. 2 is a block diagram of virtual machines coupled to the memory sub-system, in accordance with some examples.

In some examples, test and validation operations can be performed on the memory sub-system 110 using multiple VMs and multiple VFs on the memory sub-system 110. For example, as shown in the diagram 200 of FIG. 2, the host system 210 (which corresponds to the host system 120 of FIG. 1) can implement multiple VMs including the first VM 212 and the second VM 214. Each of the first VM 212 and the second VM 214 communicates with a SSD 230 (which can correspond to the memory sub-system 110 of FIG. 1) via a hypervisor 220. The hypervisor 220 can perform minimal routing operations and configuration operations for setting up the SSD 230 to handle the multiple VMs including the first VM 212 and the second VM 214. For example, if there are four VMs implemented by the host system 210, the hypervisor 220 configures the SSD 230 to include or generate four different namespaces and four different VFs.

The SSD 230 includes an SSD controller 260 (which can correspond to the memory sub-system controller 115 of FIG. 1). The SSD controller 260 receives the configuration data from the hypervisor 220 and generates multiple namespaces 240 and 242 with respective sets of LBAs to correspond to the first VM 212 and the second VM 214. Each namespace 240 and 242 can read/write data to a respective set of physical memory addresses on portions of the flash memory 250 and 252 (which can correspond to the set of memory components 112A to 112N) and/or on overlapping sets of physical memory addresses.

In some cases, the first VM 212 can implement a first database application and the second VM 214 can implement a second database application. The hypervisor 220 can generate test patterns for the first VM 212 and the second VM 214 to execute to simulate critical or corner cases associated with multiple applications or VMs operating on the same SSD 230. The first VM 212 can directly perform a first set of memory operations (e.g., read/write operations) on the first namespace 240 of SSD 230 via a first VF 232. The second VM 214 can directly perform a second set of memory operations (e.g., read/write operations) on the second namespace 242 of SSD 230 via a second VF 234. Because of the minimal interaction and involvement that the hypervisor 220 has in routing memory operations from the first VM 212 and the second VM 214 to the SSD 230, the hypervisor 220 is unable to track and monitor traffic patterns. Even if the hypervisor 220 were more involved in monitoring traffic patterns, the need to communicate with the first VM 212 and the second VM 214 over a network (e.g., ethernet) is very slow, which introduces delay in assessing the actual performance of the SSD 230. This prevents the hypervisor 220 from accurately measuring performance of the SSD 230 being operated by multiple VMs including the first VM 212 and the second VM 214.

Figure 3:
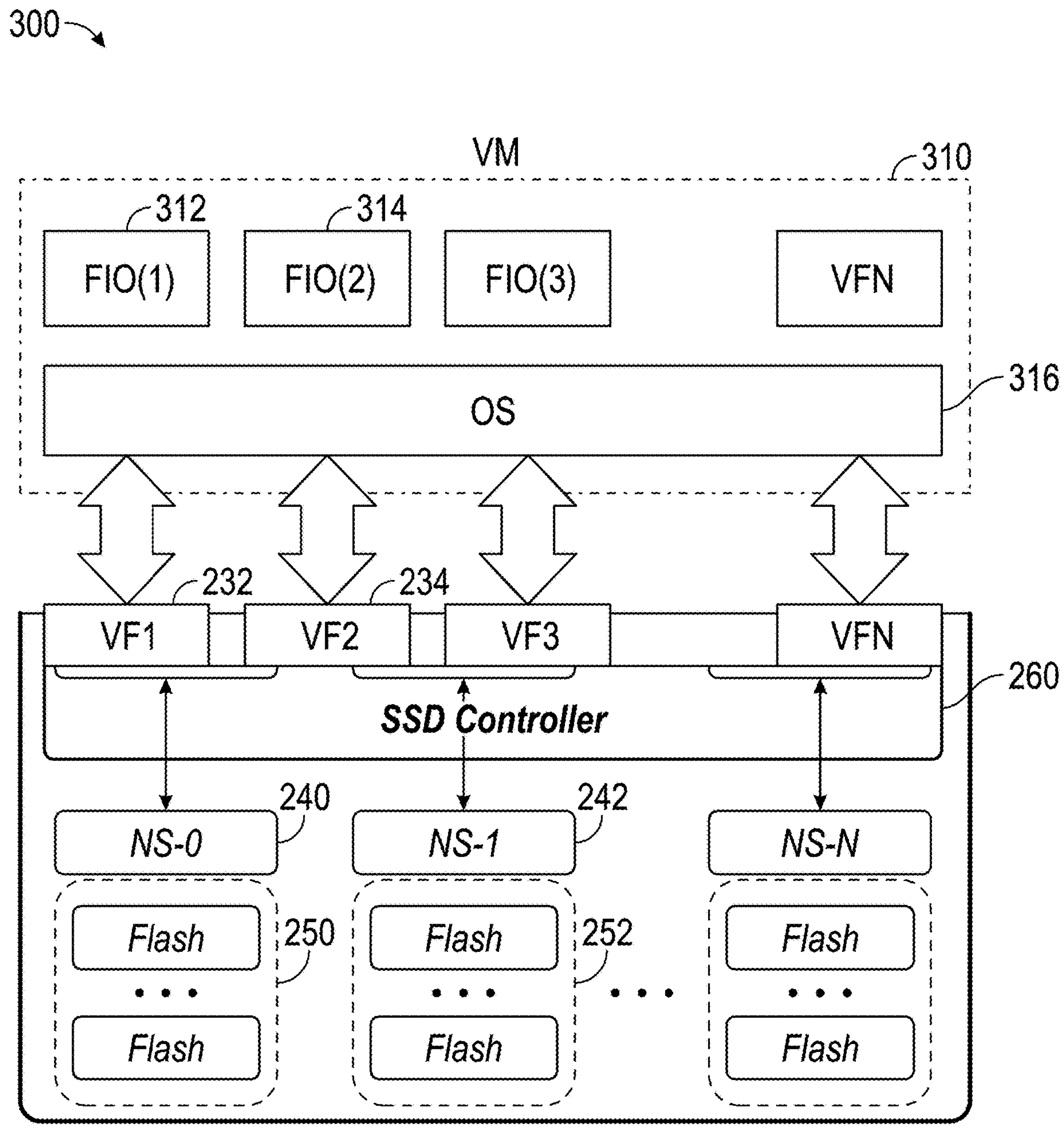
FIG. 3 is a block diagram of an example a single virtual machine coupled to the memory sub-system, in accordance with some examples.

To address these shortcomings, according to some examples, rather than implementing multiple VMs including the first VM 212 and the second VM 214 as separate machines or VMs, a single VM can be used to simulate the behavior of the multiple VMs including the first VM 212 and the second VM 214 in performing memory operations on the SSD 230. For example, as shown in the diagram 300 of FIG. 3, the first application implemented by the first VM 212 can be translated into a first FIO script 312 (flexible IO tester script). This first FIO script 312 implements a first application instance. Specifically, the host system 120 can apply a set of test functions and simulation patterns to the first application to generate a representation of the IO patterns associated with the first application. The IO patterns can be aggregated into a profile and used to generate a FIO script. The FIO script is a versatile tool for benchmarking and stress testing the IO performance of storage systems. The FIO script can simulate a wide range of IO workloads and can be used to test the performance of hard drives, SSDs, and other storage devices. The FIO script can contain a set of parameters and configurations that define the type of IO operations to be performed during the test. These parameters can include the proportion of read operations to write operations; the size of each I/O operation, which can affect sequential and random IO performance; the number of IO operations to keep in the queue, which can influence how well the storage device handles concurrent operations; duration of the test and/or the number of parallel threads or jobs to run, simulating multiple applications accessing the storage device simultaneously. When executed, FIO follows the script's instructions to generate the specified IO workload, allowing testers to measure and analyze the performance characteristics of the storage device under test. The FIO script can allow the host system 120 to systematically evaluate storage performance and gather detailed metrics on throughput, latency, and IOPS (IO operations per second).

The FIO script performs the same frequency and range of read/write operations as the first application without executing any logical operations of the first application. This results in a more efficient representation of the first application which can be implemented by a single VM with minimal resource consumption (e.g., with minimal processing power). Namely, the need to generate and monitor traffic patterns of various applications and the SSD controller 260 does not involve actually performing data computations but only involves monitoring how data is read/written from/to the memory sub-system. As such, generating a script that simulates the read/write patterns of each application can reduce the resources needed to implement each application all the while allowing the data traffic patterns to be monitored.

Similarly, the second application implemented by the second VM 214 can be translated into a second FIO script 314. This second FIO script 314 implements a second application instance. Specifically, the host system 120 can apply a set of test functions and simulation patterns to the second application to generate a representation of the IO patterns associated with the second application. In some examples, rather than generating the FIO script for each application, the host system 120 can retrieve the FIO script from a database. In such cases, the host system 120 can obtain an identifier of a type of application implemented by the first VM 212. The host system 120 can then search a database of FIO scripts to retrieve the FIO script associated with the type of application implemented by the first VM 212. The retrieved script is then stored as the first FIO script 312. Similarly, the host system 120 can obtain an identifier of a second type of application implemented by the second VM 214. The host system 120 can then search a database of FIO scripts to retrieve the FIO script associated with the second type of application implemented by the second VM 214. The retrieved script is then stored as the second FIO script 314.

The host system 120 can implement a single VM 310 that executes multiple FIO scripts including the first FIO script 312 and second FIO script 314. The single VM 310 can include an operating system 316. The operating system 316 can generate configuration information for the SSD controller 260. Based on the configuration information, the SSD controller 260 can generate multiple namespaces, as discussed in connection with FIG. 2.

In some examples, the first FIO script 312 communicates with the first namespace 240 via the operating system 316 and the first VF 232. In addition, the second FIO script 314 communicates with the second namespaces 242 via the operating system 316 and the second VF 234. This allows each FIO script to directly perform memory operations on a respective namespace of the SSD controller 260 with some involvement of the operating system 316. Because the memory operations are routed through the operating system 316 (as the operating system 316 is managing the operations of all the FIOs implemented by the single VM 310), the operating system 316 can monitor the traffic patterns and generate metrics representing how multiple applications (corresponding to the FIOs) would behave and operate together when they share access to the same memory sub-system 110. This enables the operating system 316 to test various critical and corner cases and determine whether access patterns of multiple applications and the SSD controller 260 satisfy various test and validation criteria.

Figure 4:
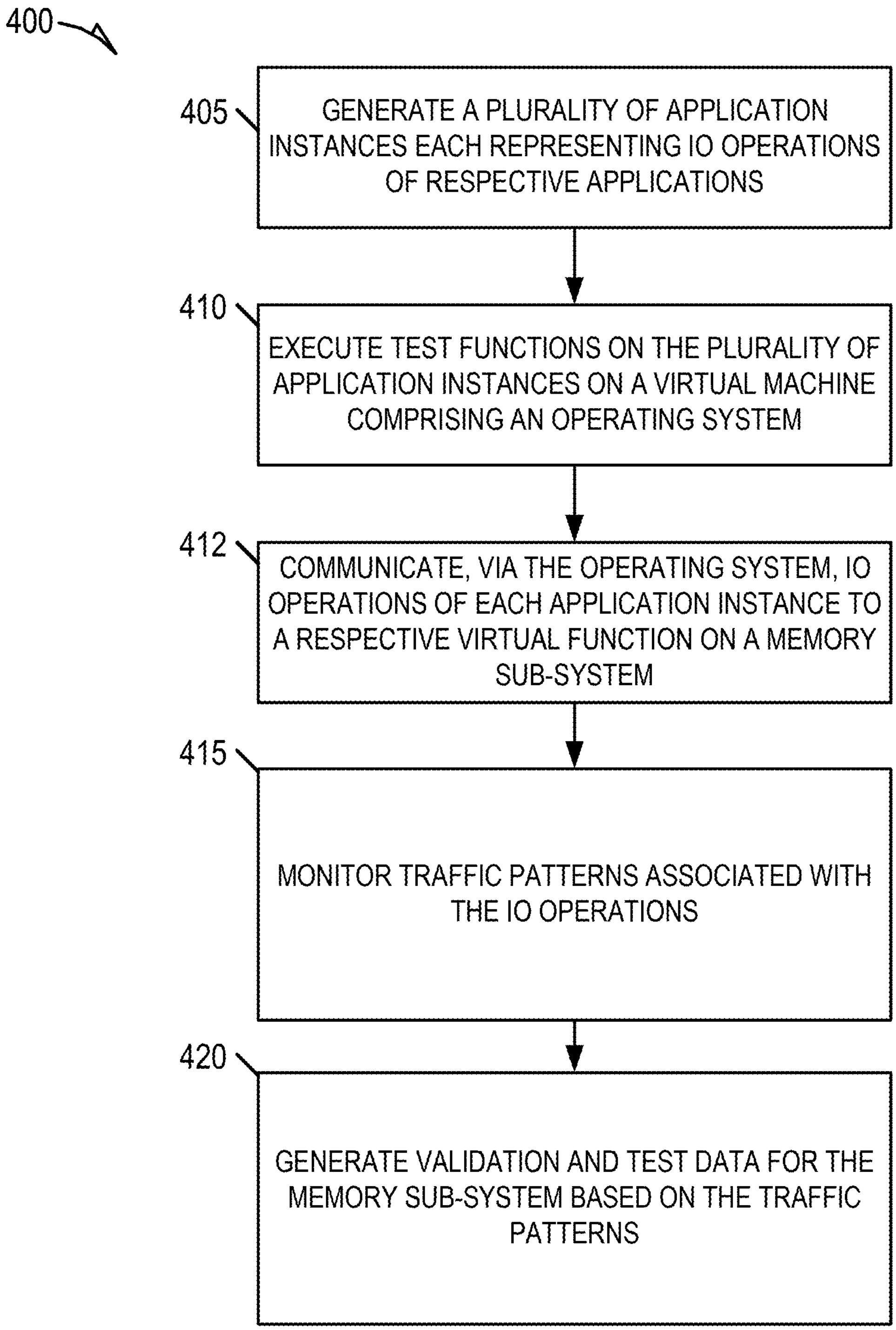
FIGS. 4-5 are flow diagrams of an example methods to test and validate a memory sub-system, in accordance with some examples.

FIG. 4 is a flow diagram of an example method 400, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 400 is performed by the host system 120 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 4, the method (or process) 400 begins at operation 405, with an operating system of the host system 120 generating a plurality of application instances each representing IO; operations of respective application. Then, at operation 410, the operating system of the host system 120 executes test and/or validation functions (e.g., corresponding to critical cases or corner conditions) on the plurality of application instances on a virtual machine that includes the operating system. At operation 412, the operating system of the host system 120 communicates IO operations of each application instance to a respective virtual function on the memory sub-system 110 and, at operation 415, monitors traffic patterns associated with the IO operations. The operating system of the host system 120, at operation 420, generates validation and test data for the memory sub-system 110 based on the monitored traffic patterns.

Figure 5:
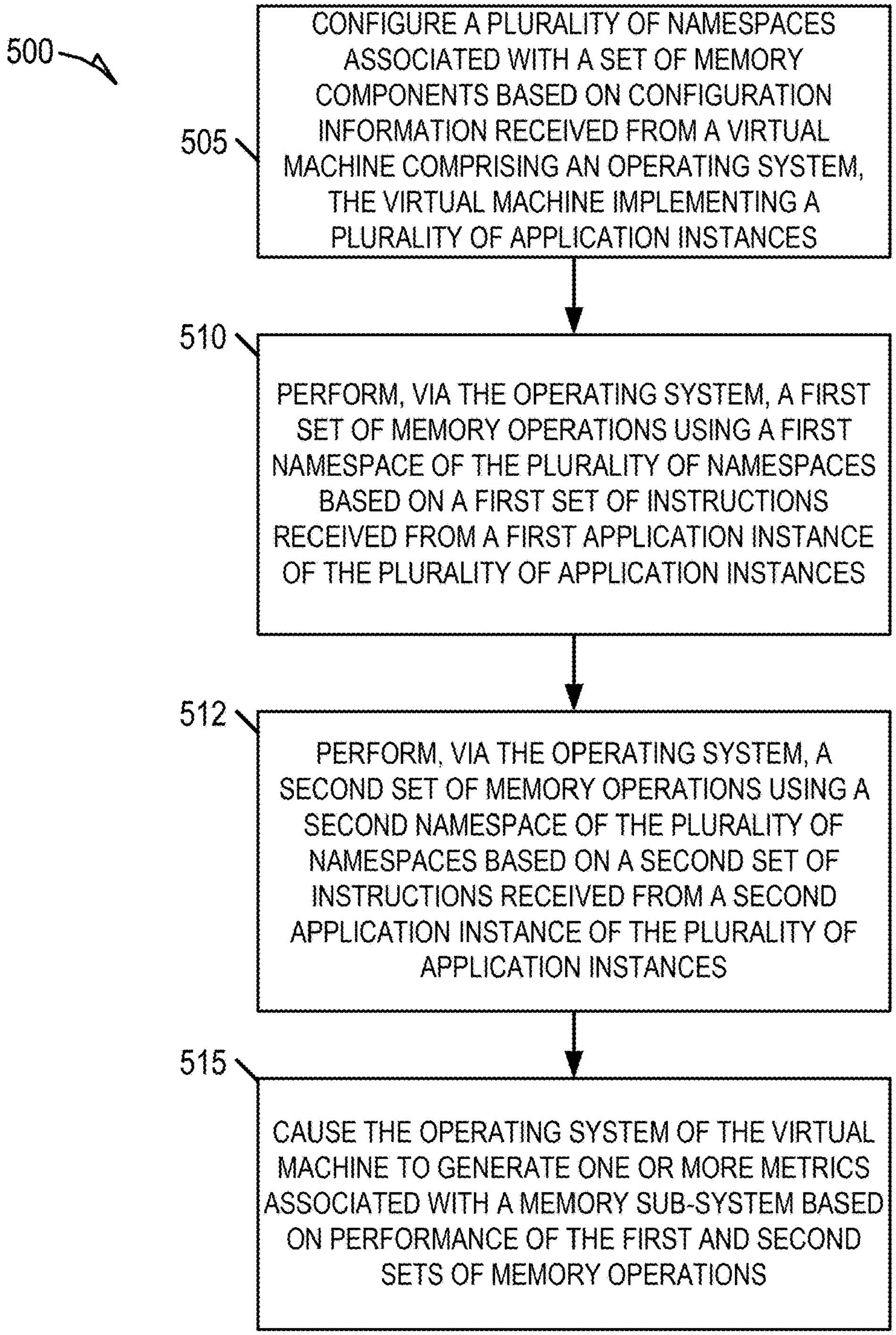

FIG. 5 is a flow diagram of an example method 500, in accordance with some examples. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 500 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 5, the method (or process) 500 begins at operation 505, with a media operations manager 122 of a memory sub-system (e.g., memory sub-system 110) configuring a plurality of namespaces associated with a set of memory components based on configuration information received from a virtual machine comprising an operating system, the virtual machine implementing a plurality of application instances. Then, at operation 510, the media operations manager 122 performs a first set of memory operations at operation 520 using a first namespace of the plurality of namespaces based on a first set of instructions received from a first application instance of the plurality of application instances. The media operations manager 122 performs a second set of memory operations using a second namespace of the plurality of namespaces based on a second set of instructions received from a second application instance of the plurality of application instances at operation 515. Then, at operation 520, the media operations manager 122 causes the operating system of the virtual machine of the host system 120 to generate one or more metrics associated with a memory sub-system based on performance of the first and second sets of memory operations.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device configured to perform operations comprising: configuring a plurality of namespaces associated with the set of memory components based on configuration information received from a virtual machine comprising an operating system, the virtual machine implementing a plurality of application instances; performing a first set of memory operations using a first namespace of the plurality of namespaces based on a first set of instructions received from a first application instance of the plurality of application instances; performing a second set of memory operations using a second namespace of the plurality of namespaces based on a second set of instructions received from a second application instance of the plurality of application instances; and causing the operating system of the virtual machine to generate one or more metrics associated with the memory sub-system based on performance of the first and second sets of memory operations.

Example 2. The system of Example 1, wherein the first namespace of the plurality of namespaces is associated with a first portion of a logical address space corresponding to the set of memory components, and wherein the second namespace of the plurality of namespaces is associated with a second portion of the logical address space corresponding to the set of memory components.

Example 3. The system of any one of Examples 1-2, wherein each of the plurality of namespaces is associated with a respective a VF of the memory sub-system.

Example 4. The system of any one of Examples 1-3, the operations comprising: accessing a first application; determining a first IO profile associated with the first application; and generating the first application instance using a script that represents the first input-output profile associated with the first application.

Example 5. The system of Example 4, the operations comprising: accessing a second application; determining a second input-output profile associated with the second application; and generating the second application instance using another script that represents the second IO profile associated with the second application.

Example 6. The system of any one of Examples 1-5, wherein the operating system generates testing and validation data based on the one or more metrics.

Example 7. The system of any one of Examples 1-6, wherein the operating system monitors traffic patterns associated with the first and second application instances and generates the one or more metrics based on the traffic patterns, the traffic patterns comprising IO operations associated with the memory sub-system.

Example 8. The system of any one of Examples 1-7, wherein the operations comprise: associating the first application instance with the first namespace; and associating the second application instance with the second namespace.

Example 9. The system of any one of Examples 1-8, wherein the operating system generates test patterns and instructs the first and second application instances to execute the test patterns.

Example 10. The system of any one of Examples 1-9, wherein the first application instance represents behavior of a first database system, and wherein the second application instance represents behavior of a second database system.

Example 11. The system of any one of Examples 1-10, wherein the operations comprise: enabling the first application instance to access the first namespace via a first virtual function of the memory sub-system; and enabling the second application instance to access the second namespace via a second virtual function of the memory sub-system.

Example 12. The system of Example 11, wherein the first set of memory operations are received via the first virtual function, and wherein the second set of memory operations are received via the second virtual function.

Example 13. The system of any one of Examples 1-12, wherein the memory sub-system comprises a solid-state drive.

Methods and computer-readable storage medium with instructions for performing any one of the above Examples.

Figure 6:
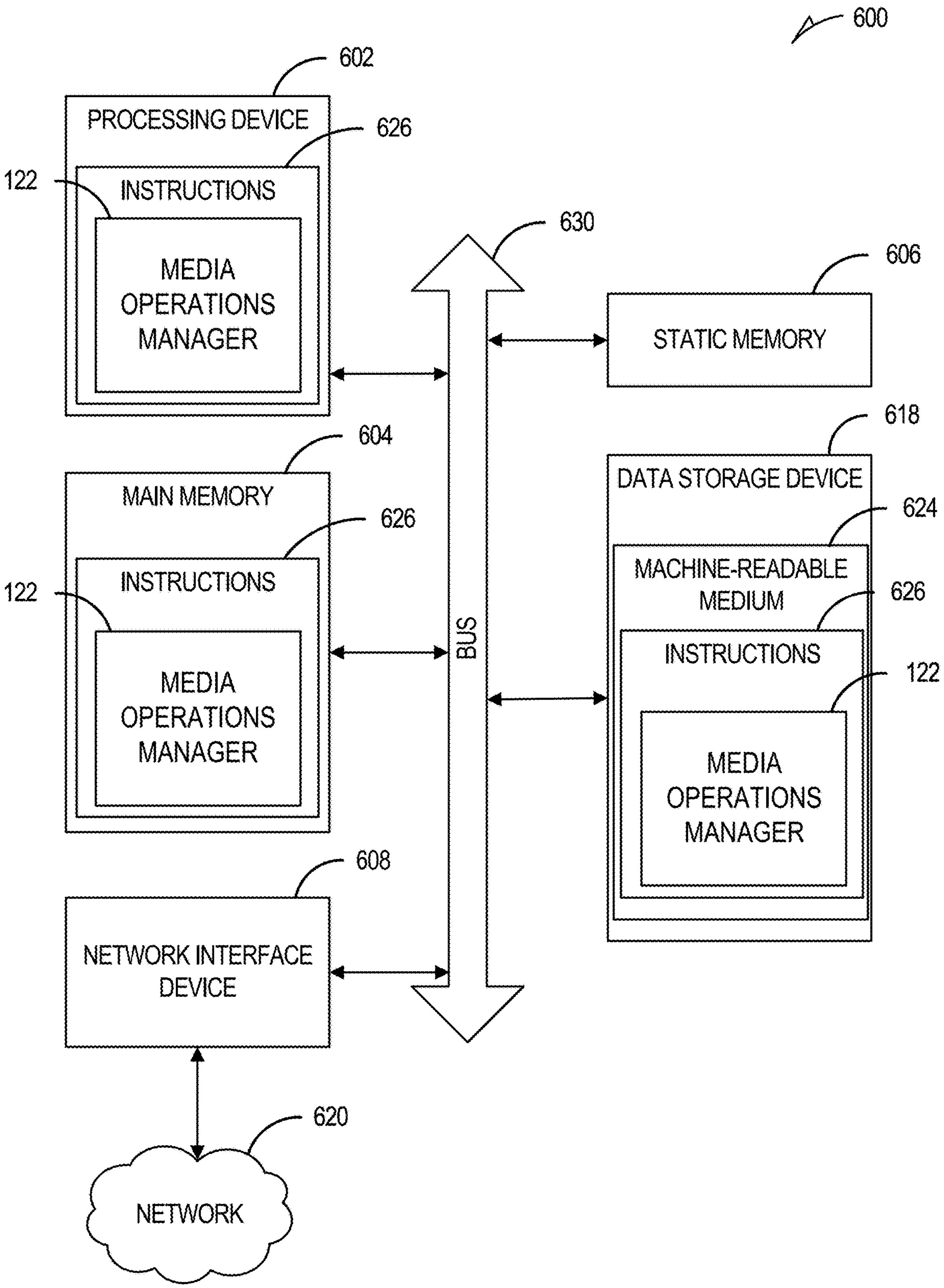
FIG. 6 is a block diagram illustrating a diagrammatic representation of a machine in the form of a computer system within which a set of instructions can be executed for causing the machine to perform any one or more of the methodologies discussed herein, in accordance with some examples of the present disclosure.

FIG. 6 illustrates an example machine in the form of a computer system 600 within which a set of instructions can be executed for causing the machine to perform any one or more of the methodologies discussed herein. In some examples, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an ASIC, a FPGA, a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one example, the instructions 626 implement functionality corresponding to the media operations manager 122 of FIG. 1. While the machine-readable storage medium 624 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; ROMs; random access memories (RAMs; EPROMS; EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine-readable (e.g., computer-readable) storage medium such as a ROM, RAM, magnetic disk storage media, optical storage media, flash memory components, and so forth.

In the foregoing specification, the disclosure has been described with reference to specific examples thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:

a set of memory components of a memory sub-system; and at least one processing device operatively coupled to the set of memory components, the at least one processing device configured to perform operations comprising:

configuring a plurality of namespaces associated with the set of memory components based on configuration information received from a virtual machine comprising an operating system, the virtual machine implementing a plurality of application instances;

performing a first set of memory operations using a first namespace of the plurality of namespaces based on a first set of instructions received from a first application instance of the plurality of application instances;

performing a second set of memory operations using a second namespace of the plurality of namespaces based on a second set of instructions received from a second application instance of the plurality of application instances; and causing the operating system of the virtual machine to generate one or more metrics associated with the memory sub-system based on performance of the first and second sets of memory operations.

2. The system of claim 1, wherein the first namespace of the plurality of namespaces is associated with a first portion of a logical address space corresponding to the set of memory components, and wherein the second namespace of the plurality of namespaces is associated with a second portion of the logical address space corresponding to the set of memory components.

3. The system of claim 1, wherein each of the plurality of namespaces is associated with a respective a virtual function (VF) of the memory sub-system.

4. The system of claim 1, the operations comprising:

accessing a first application;

determining a first input-output profile associated with the first application; and generating the first application instance using a script that represents the first input-output profile associated with the first application.

5. The system of claim 4, the operations comprising:

accessing a second application;

determining a second input-output profile associated with the second application; and generating the second application instance using another script that represents the second input-output profile associated with the second application.

6. The system of claim 1, wherein the operating system generates testing and validation data based on the one or more metrics.

7. The system of claim 1, wherein the operating system monitors traffic patterns associated with the first and second application instances and generates the one or more metrics based on the traffic patterns, the traffic patterns comprising input-output operations associated with the memory sub-system.

8. The system of claim 1, wherein the operations comprise:

associating the first application instance with the first namespace; and associating the second application instance with the second namespace.

9. The system of claim 1, wherein the operating system generates test patterns and instructs the first and second application instances to execute the test patterns.

10. The system of claim 1, wherein the first application instance represents behavior of a first database system, and wherein the second application instance represents behavior of a second database system.

11. The system of claim 1, wherein the operations comprise:

enabling the first application instance to access the first namespace via a first virtual function of the memory sub-system; and enabling the second application instance to access the second namespace via a second virtual function of the memory sub-system.

12. The system of claim 11, wherein the first set of memory operations are received via the first virtual function; and wherein the second set of memory operations are received via the second virtual function.

13. The system of claim 1, wherein the memory sub-system comprises a solid-state drive.

14. A method comprising:

configuring a plurality of namespaces associated with a set of memory components based on configuration information received from a virtual machine comprising an operating system, the virtual machine implementing a plurality of application instances;

performing a first set of memory operations using a first namespace of the plurality of namespaces based on a first set of instructions received from a first application instance of the plurality of application instances;

performing a second set of memory operations using a second namespace of the plurality of namespaces based on a second set of instructions received from a second application instance of the plurality of application instances; and causing the operating system of the virtual machine to generate one or more metrics associated with a memory sub-system based on performance of the first and second sets of memory operations.

15. The method of claim 14, wherein the first namespace of the plurality of namespaces is associated with a first portion of a logical address space corresponding to the set of memory components; and wherein the second namespace of the plurality of namespaces is associated with a second portion of the logical address space corresponding to the set of memory components.

16. The method of claim 14, wherein each of the plurality of namespaces is associated with a respective a virtual function (VF) of the memory sub-system.

17. The method of claim 14, comprising:

accessing a first application;

determining a first input-output profile associated with the first application; and generating the first application instance using a script that represents the first input-output profile associated with the first application.

18. The method of claim 17, comprising:

accessing a second application;

determining a second input-output profile associated with the second application; and generating the second application instance using another script that represents the second input-output profile associated with the second application.

19. The method of claim 14, wherein the operating system generates testing and validation data based on the one or more metrics.

20. A non-transitory computer-readable storage medium comprising instructions that, when executed by at least one processing device, cause the at least one processing device to perform operations comprising:

configuring a plurality of namespaces associated with a set of memory components based on configuration information received from a virtual machine comprising an operating system, the virtual machine implementing a plurality of application instances;

performing a first set of memory operations using a first namespace of the plurality of namespaces based on a first set of instructions received from a first application instance of the plurality of application instances;

performing a second set of memory operations using a second namespace of the plurality of namespaces based on a second set of instructions received from a second application instance of the plurality of application instances; and causing the operating system of the virtual machine to generate one or more metrics associated with a memory sub-system based on performance of the first and second sets of memory operations.

* * * * *